(12) United States Patent
Agrawal et al.

(10) Patent No.: US 11,157,562 B2
(45) Date of Patent: Oct. 26, 2021

(54) DETERMINING APPAREL-BASED RECOMMENDATIONS FOR A USER

(71) Applicant: International Business Machines Corporation, Armonk, NY (US)

(72) Inventors: Priyanka Agrawal, Bangalore (IN); Ayushi Dalmia, New Delhi (IN); Pankaj Satyanarayan Dayama, Bangalore (IN); Vikas Raykar, Bangalore (IN); Amrita Saha, Bangalore (IN); Srikanth Govindaraj Tamilselvam, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/290,682

(22) Filed: Mar. 1, 2019

(65) Prior Publication Data

US 2019/0197058 A1    Jun. 27, 2019

Related U.S. Application Data

(63) Continuation-in-part of application No. 15/786,850, filed on Oct. 18, 2017, now abandoned.

(51) Int. Cl.
*G06Q 30/06* (2012.01)
*G06F 16/9032* (2019.01)
(Continued)

(52) U.S. Cl.
CPC ...... *G06F 16/90328* (2019.01); *G06F 16/906* (2019.01); *G06F 16/9035* (2019.01); *G06Q 30/0631* (2013.01)

(58) Field of Classification Search
None
See application file for complete search history.

(56) References Cited

U.S. PATENT DOCUMENTS

2014/0052567 A1*  2/2014  Bhardwaj .......... G06Q 30/0631
                                              705/26.7
2014/0156449 A1   6/2014  Ganesan et al.
(Continued)

FOREIGN PATENT DOCUMENTS

WO    2014008479 A1    1/2014
WO    2016161005 A1   10/2016

OTHER PUBLICATIONS

Fahim, Muhammad et al. "ATHENA: a personalized platform to promote an active lifestyle and wellbeing based on physical, mental and social health primitives." Sensors (Basel, Switzerland) vol. 14,5 9313-29. May 23, 2014, doi: 10.3390/s140509313 (Year: 2014).*

*Primary Examiner* — Michelle T Kringen
(74) *Attorney, Agent, or Firm* — Ference & Associates LLC

(57) ABSTRACT

Aspects of the present invention disclose a method, computer program product, and system for recommending an apparel product is provided. The method for recommending an apparel product may include one or more processors identifying a user selection of an apparel product, wherein the apparel product includes information associated with retail websites. The method further includes one or more processors categorizing the apparel product into one or more groupings based upon user preferences, wherein the grouping is based on available versions of the apparel product. The method further includes one or more processors determining current apparel preference information corresponding to the user based on user preferences, fitness application data, health monitoring application data, and user-provided measurements. The method further includes one or more processors determining a recommended garment of the identified user-selected apparel product based on mapping the (Continued)

determined apparel preference information to product specifications of the identified user-selected apparel product.

20 Claims, 3 Drawing Sheets

(51) Int. Cl.
*G06F 16/906* (2019.01)
*G06F 16/9035* (2019.01)

(56) References Cited

U.S. PATENT DOCUMENTS

2014/0180864 A1* 6/2014 Orlov ................. G06Q 30/0631
   705/26.7
2015/0279069 A1* 10/2015 Melcher ................ H04L 63/107
   345/440
2018/0253840 A1* 9/2018 Tran ....................... G16H 40/63

* cited by examiner

DETERMINING APPAREL-BASED RECOMMENDATIONS FOR A USER

CROSS REFERENCE TO RELATED APPLICATIONS

This application is a continuation-in-part application of U.S. patent application Ser. No. 15/786,850, filed Oct. 18, 2017, the contents of which are incorporated by reference herein.

BACKGROUND

The present invention relates generally to the field of e-commerce, and more particularly to determining apparel product recommendations.

A virtual dressing room (also often referred to as virtual fitting room and virtual changing room although they do, on examination, perform different functions) is the online equivalent of an in-store changing room. It enables shoppers to try on clothes to check one or more of size, fit, or style, but virtually rather than physically. Fit technology may be categorized according to the problem that it resolves (size, fit, or styling) or according to the technological approach. There are many different types of technological approaches.

Recommendation systems offer the shopper a suggested size, based on a combination of factors. Generally, only minimal fit information can be communicated by such systems, because size is different from fit. Some recommendation systems use existing garments to recommend a size, while others use measurements taken by the customer.

Body scanner technologies come in two distinct flavors: scanners that use technologies, such as webcams, phone cameras, and scanners that use more sophisticated technologies requiring the shopper to travel to the scanner.

Web and phone camera technologies require users to stand a fixed distance away from the camera and to hold a standard-sized object (such as a CD) that the camera can use as a reference for size.

Garment comparison helps shoppers select correctly sized garments based on products already in their wardrobe. Users physically measure a well-fitting garment they already own and enter these details into an application or select previously purchased products from online retailers to receive a visual comparison between the reference garment and a potential purchase.

3D fitting rooms use computer-generated 3D images to create an experience similar to that seen in virtual world computer games. These solutions generate a virtual mannequin (avatar) using customer body characteristics. These solutions allow the shopper to create a 3D version of him/herself using either information taken from scanning devices, by measuring themselves, or by providing other biometric information. The 3D model can also be tweaked by the customer.

SUMMARY

According to one embodiment of the present invention, a method for recommending an apparel product is provided. The method for recommending an apparel product may include one or more processors identifying a user selection of an apparel product, wherein the apparel product includes information associated with retail websites. The method further includes one or more processors categorizing the apparel product into one or more groupings based upon user preferences, wherein the grouping is based on available versions of the apparel product. The method further includes one or more processors determining current apparel preference information corresponding to the user based on user preferences, fitness application data, health monitoring application data, and user-provided measurements. The method further includes one or more processors determining a recommended garment of the identified user-selected apparel product based on mapping the determined apparel preference information to product specifications of the identified user-selected apparel product.

DETAILED DESCRIPTION

Embodiments of the present invention recognize that current technological approaches to virtual dressing rooms are not feasible for users to provide accurate and detailed user characteristics, nor do such approaches have precise knowledge of the apparel that is comfortable for that person.

Embodiments of the present invention recognize that current technologies use a perfect mapping between detailed measurements and require details to be available for every product and for every brand across every major geographical location. Embodiments of the present invention further recognize that current approaches use a very contrived setting where the image scaling and poses, which the user takes, do not provide a detailed fitting recommendation about the different apparel-specific aspects of fitting.

Embodiments of the present invention recognize that one of the main causes of fit/size related issues is the variance of the size of fitting for the same product across different brands or demographics, as every manufacturer has their own sizing scheme and different countries use different sizing/fitting nomenclature.

Embodiments of the present invention provide a system and method that learns an aspect based standardization of size/fitting offline. Embodiments of the present invention also provide a method to estimate the current size/fit preference of a user based on historical information, recent dynamic updates, based on user's current lifestyle, and recommends the appropriate size or fittings of apparel across different brands using the learned aspect based standardized of sizing/fitting chart.

Figure 1:
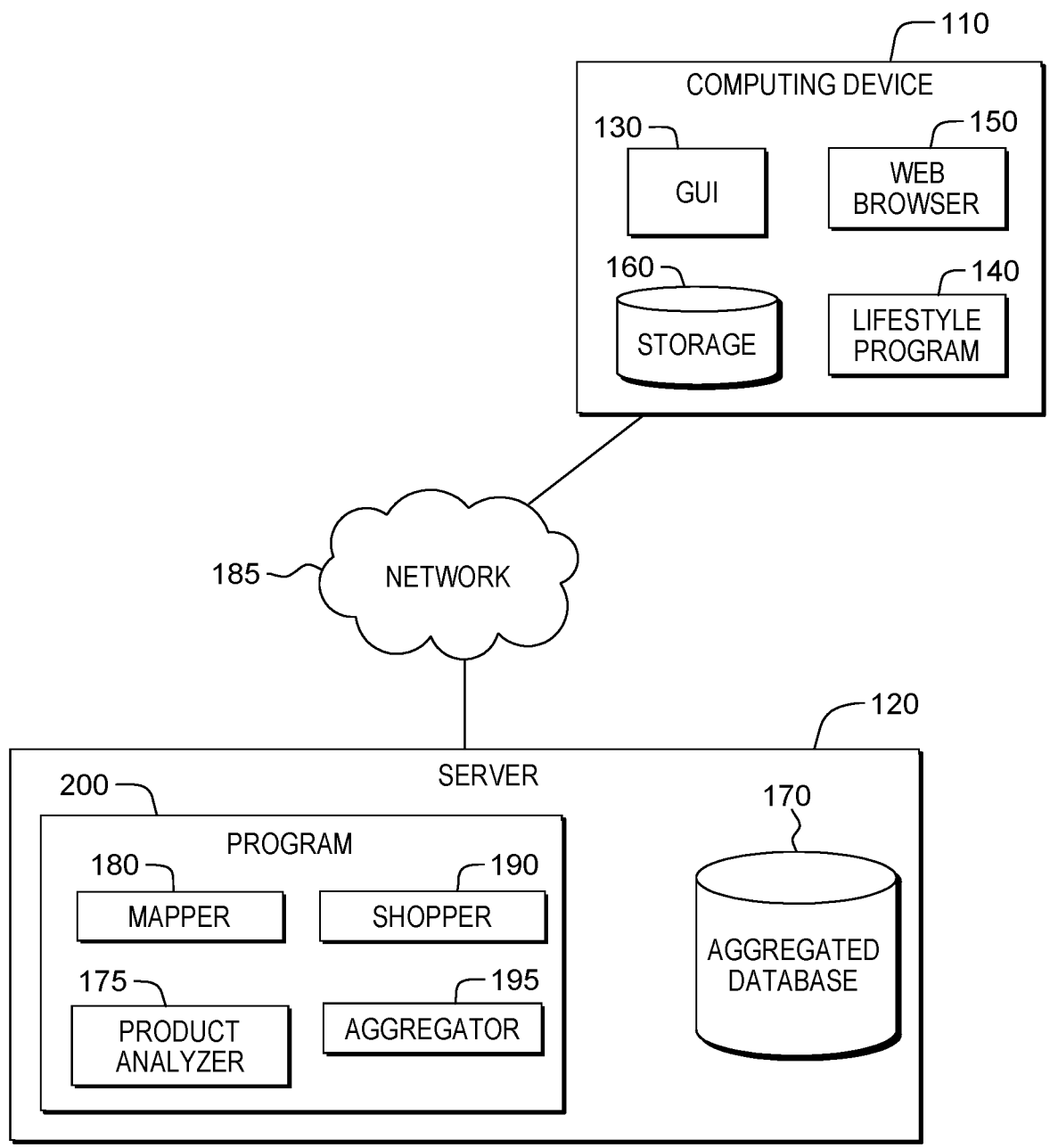
FIG. 1 is a functional block diagram illustrating a distributed data processing environment, in accordance with an embodiment of the present invention.

Example embodiments, in accordance with the present invention, will now be described in detail with reference to the Figures. FIG. 1 is a functional block diagram that includes computing device 110 and server computer 120, interconnected over network 185.

In one embodiment, computing device 110 includes graphical user interface (GUI) 130, lifestyle program 140, web browser 150, and storage 160. The various programs on computing device 110 include a web browser, an electronic mail client, security software (e.g., a firewall program, a geo-locating program, an encryption program, etc.), an instant messaging (IM) application (app), and a communication (e.g., phone) application.

Computing device 110 may be a desktop computer, a laptop computer, a tablet computer, a specialized computer server, a smartphone, a wearable device (e.g., smart watch, personal fitness device, personal safety device), or any programmable computer system known in the art with an interactive display or any other computer system known in the art. In certain embodiments, computing device 110 represents a computer system utilizing clustered computers and components that act as a single pool of seamless resources when accessed through network 185, as is common in data centers and with cloud computing applications. In general, computing device 110 is representative of any programmable electronic device or combination of programmable electronic devices capable of executing machine-readable program instructions and communicating with other computer devices via a network.

In one embodiment, graphical user interface 130 operates on computing device 110. In another embodiment, graphical user interface 130 operates on another computer in a server based setting, for example, on a server computer (e.g., server 120). In yet another embodiment, graphical user interface 130 operates on computing device 110 simultaneously with a server computer interconnected through network 185 (e.g., server 120). Graphical user interface 130 may be any user interface used to access information from computing device 110, such as information gathered or produced by cognitive bespoke program 200. Additionally, graphical user interface 130 may be any user interface used to supply information to computing device 110, such as information supplied by a user to be used by cognitive bespoke program 200. In some embodiments, graphical user interface 130 may present a generic web browser used to retrieve, present, and negotiate resources from the Internet. In other embodiments, graphical user interface 130 may be a software or application that enables a user at computing device 110 access to network 185.

In yet another embodiment, a user of computing device 110 can interact with graphical user interface 130 through a touch screen that performs as both an input device to a graphical user interface (GUI) and as an output device (i.e., an electronic display) presenting a plurality of icons associated with software applications or images depicting the executing software application. Optionally, a software application (e.g., a web browser) can generate graphical user interface 130 operating within the GUI of computing device 110. Graphical user interface 130 accepts input from a plurality of input/output (I/O) devices including, but not limited to, a tactile sensor interface (e.g., a touch screen or a touchpad) referred to as a multi-touch display. An I/O device interfacing with graphical user interface 130 may be connected to computing device 110, which may operate utilizing wired (e.g., USB port) or wireless network communications (e.g., infrared, NFC, etc.). Computing device 110 may include components, as depicted and described in further detail with respect to FIG. 3, in accordance with embodiments of the present invention.

Lifestyle monitor program 140 may be a combination of one or more health applications that monitor and track a user's daily caloric intake. In an example embodiment, the one or more health care applications tracks a user's blood pressure, hydration levels, heart rate, and potentially several other blood-related data points, such as glucose levels, motion tracking abilities. In an example, lifestyle monitor program 140 combines the data from one or more fitness applications, such as a pedometer.

In this example, lifestyle monitor program 140 uses a geographic information system (GIS) to capture, store, manipulate, analyze, manage, and present all types of geographic data. In general, a GIS describes any information system that integrates, stores, edits, analyzes, shares, and displays geographic information. Lifestyle monitor program 140 contains GPS receivers and contains other sensors and/or receivers used by cognitive bespoke program 200 to calculate the amount of calories expended from daily exercise of a user. Lifestyle monitor program 140 uses the daily caloric intake and daily exercise data of a user to calculate a resultant change in the body of a user over a time period.

In another example, the GIS sub program on lifestyle monitor program 140 receives a series of data points collected by one or more fitness applications to determine that a user has run five miles over the course of a week. Lifestyle monitor program 140 combines the data from one or more fitness applications with heart rate data and blood pressure data to calculate that a body of a user has changed over a defined period of time.

Web browser 150 may be a generic web browser used to retrieve, present, and traverse information resources from the Internet. In some embodiments, web browser 150 may be a web browser designed for a mobile device. In other embodiments, web browser 150 may be a web browser designed for a traditional computing device, such as a desktop computer, PC, or laptop. In general, web browser 150 may be any application or software that enables a user of computing device 110 to access a webpage over network 185. In the depicted environment, web browser 150 resides on computing device 110. In other embodiments, web browser 150, or similar web browsers, may reside on other computing devices capable of accessing a webpage over network 185.

Storage 160 (e.g., a database) located on computing device 110, represents any type of storage device capable of storing data that is accessed and utilized by computing device 110. In other embodiments, storage 160 represents multiple storage devices within computing device 110. Storage 160 stores information such as, but not limited to, account information, credentials for authentication, user preferences, lists of preferred users, previously visited websites, history of visited Wi-Fi portals, and the history of the location of the computing device. For example, storage 160 stores the apparel categories, a user's detailed measurements, feedback from a user's past returned products, a history of purchases of apparel, usage information of a user's current wardrobe, and information derived from lifestyle monitor program 140, such as changes to the body of the user.

In general, network 185 can be any combination of connections and protocols that will support communications among computing device 110. Network 185 can include, for example, a local area network (LAN), a wide area network (WAN), such as the Internet, a cellular network, or any combination of the preceding, and can further include wired, wireless, and/or fiber optic connections.

Server 120 may be a desktop computer, a laptop computer, a tablet computer, a specialized computer server, a smartphone, or any other computer system known in the art. In certain embodiments, server 120 represents a computer system utilizing clustered computers and components that act as a single pool of seamless resources when accessed through network 185, as is common in data centers and with cloud computing applications. In general, server 120 is representative of any programmable electronic device or combination of programmable electronic devices capable of executing machine-readable program instructions and communicating with other computer devices via a network. In one embodiment, server 120 includes aggregated database 170, and cognitive bespoke program 200.

In an embodiment, server 120 is capable of initiating a handshake process between server 120 and computing device 110. Handshaking is an automated process of negotiation that dynamically sets parameters of a communications channel established between two entities before normal communication over the channel begins. Handshaking follows the physical establishment of the channel and precedes normal information transfer. Handshaking facilitates connecting heterogeneous computing systems, or equipment, over a communication channel without the need for user intervention to set parameters. In an example, server 120 initiates the handshake process by sending a massage to computing device 110 indicating that server 120 wants to establish a communication channel in order to gain access to programs on computing device 110.

Aggregated database 170 may be a repository that may be read by server 120. Aggregated database 170 represents any type of storage device capable of storing data that are accessed and utilized by server 120. In other embodiments, aggregated database 170 represents multiple storage devices within server 120. Aggregated database 170 stores information such as, but not limited to, account information, credentials for authentication, user preferences, lists of preferred users, previously visited websites, history of visited Wi-Fi portals, and the history of the computing devices, and information located on the computing devices, that access the server. Aggregated database 170 stores a plurality of data from retail websites, digital wardrobe data, social network data, and historical data related to fitness and lifestyle applications.

In one embodiment, cognitive bespoke program 200 operates on server 120. In another embodiment, cognitive bespoke program 200 operates on another computer in a server-based setting, for example on a server computer not shown. In yet another embodiment, cognitive bespoke program 200 operates on computing device 110 simultaneously with server 120 interconnected through network 185. Cognitive bespoke program 200 provides the capability to transpose ranking models across two or more sets of objects characterized by different features. Cognitive bespoke program 200 is capable of utilizing Wi-Fi technology, Bluetooth, Near Field Communication tags (NFC), Global System for Mobile Communications (GSM), and Global Positioning System Technology (GPS) to communicate with computing device 110.

In an example embodiment, cognitive bespoke program 200 operates as a code snippet within one or more applications on computing device 110. Code snippets define the scope of interactivity between the snippets and the application, (e.g., cognitive bespoke program 200 hosted by a web browser application on server 120). For example, cognitive bespoke program 200 is a function within web browser 150, and the processes of cognitive bespoke program 200 occurs automatically (i.e., without user intervention) during operation of web browser 150 as initiated by cognitive bespoke program 200. The dynamic code snippet elements provide scripting support. The variables enable dialog between cognitive bespoke program 200, through server 120, graphical user interface 130, and web browser 150.

In one embodiment, cognitive bespoke program 200 updates apparel recommendations, for example, based upon sizing and fit of the apparel, for a user profile based on the user's current lifestyle. In an example, cognitive bespoke program 200 combines data from one or more fitness applications to predict the user's body profile on a database. In this example, cognitive bespoke program 200 maps the user's predicted body profile or characteristics to the different available sizes and/or fits in different clothing brands. In another example, cognitive bespoke program 200 takes, as additional input, measurements provided by the user, either before or after the changes to the body, to determine the appropriate garment size and/or fit for a user in different clothing brands.

Product analyzer 175 is a subprogram of cognitive bespoke program 200 that analyzes and detects information related to individual retail products for a particular brand. Product analyzer 175 analyzes brand information, apparel information, measurements that correspond to a particular size and/or fit for a brand, and fitting nomenclature across multiple brands. Product analyzer 175 assists cognitive bespoke program 200 in determining the personalized fit based categorization of a particular product, garment, or apparel.

Mapper 180 is a sub program of cognitive bespoke program 200 that connects the different sizes of multiple brands to the current user as determined by information from one or more sources. Mapper 180 directs the mapping of a user's measurements and/or body profile onto a product as determined by the specifications of the clothing.

Shopper 190 is a sub program of cognitive bespoke program 200 that functions similar to a web crawler. Shopper 190 enables cognitive bespoke program 200 to find and locate new domains and URLs that are clothing retail websites. In an embodiment, shopper 190 utilizes a web crawler sub program to systematically browse the World Wide Web. Shopper 190, through the web crawler sub program, analyzes and validates hyperlinks and Hyper Text Markup Language (HTML) code that relate to clothing retail websites. Shopper 190 is capable of archiving visited websites in aggregated database 170 and saving information. The files are stored in aggregated database 170 such that cognitive bespoke program 200 can view, analyze, and navigate the information from previously visited clothing retail websites.

Aggregator 195 is a sub program of cognitive bespoke program 200 that combines multiple streams of information and data that cognitive bespoke program 200 uses to update apparel recommendations for the user based upon the body profile and/or measurements. Aggregator 195 combines all the input received by cognitive bespoke program 200 to eventually be stored in aggregated database 170. Aggregator 195 receives information related to a digital wardrobe application, history of a user's online purchases and returns, the sizes of the articles of clothing purchased by a user, health tracker information, lifestyle information, and other information used by cognitive bespoke program 200

Figure 2:
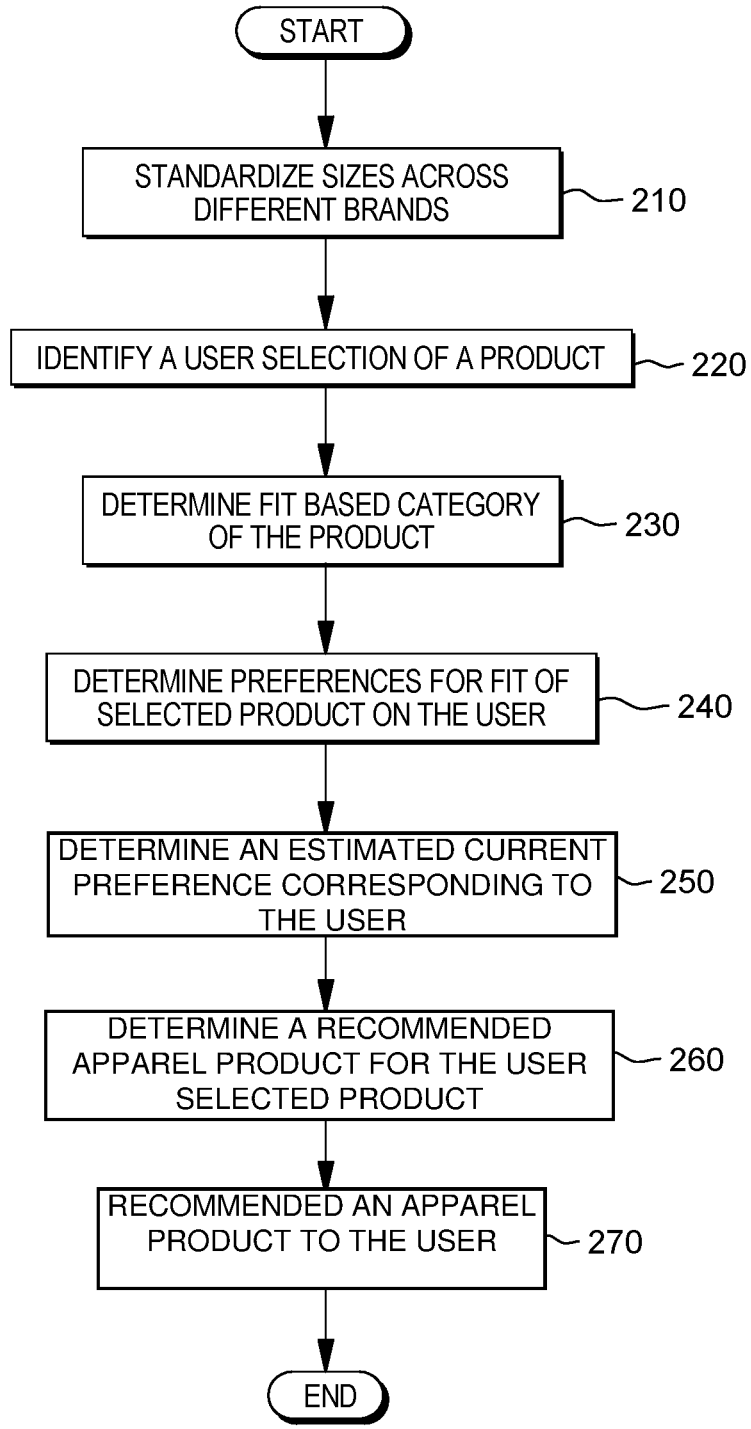
FIG. 2 is a flowchart depicting operational steps of a program for updating a user's apparel information in a user profile based on a user's current lifestyle, in accordance with an embodiment of the present invention.

FIG. 2 is a flowchart depicting the operational steps of cognitive bespoke program 200, a program for updating a recommendation for apparel, including size and/or fit, in a user profile based on a user's current lifestyle, in accordance with an embodiment of the present invention.

In step 210, cognitive bespoke program 200 standardizes sizes across different brands. In one embodiment, cognitive bespoke program 200, using sub program, aggregator 195 combines data and other information from multiple sources to develop a standardized sizing chart across multiple brands and demographics. In an example, cognitive bespoke program 200 collects data and information for every apparel type. Cognitive bespoke program 200 collects the available apparel measurements in product web pages, sizing charts, type of fitting of the product, the product brand, product type, country of origin, available garment size information in online retail catalogs, and targeted demographic information in product catalogs. Cognitive bespoke program 200 uses the collected information to determine a fine-grained mapping, using mapper 180, between the different apparel measurements and the size information given by the brand. In this example, cognitive bespoke program 200 determines that a particular size and/or fit in one clothing brand corresponds to a different particular size and/or fit in a different clothing brand and that both of these correspond to a particular body profile.

In this embodiment, cognitive bespoke program 200 aggregates the mapping between measurements and sizes across different brands and countries around the world. Cognitive bespoke program 200 aggregates the data from a large user base where users have used the same products from different brands. Cognitive bespoke program 200 uses commonality and differences in usage patterns of the different brands and estimates a mapping of sizes between different brands. Cognitive bespoke program 200 uses the previously discussed data and information to generate a weighted combination (since all measurements may not be equally important in deciding the fit of a specific type of garment) or different measurements to estimate the size across all available brands and demographics. Cognitive bespoke program 200 standardizes sizing across multiple brands and target demographics for the brands.

In an example, a standardized fit for a specific demographic would be the group "athletes." Cognitive bespoke program 200 would analyze multiple brands across the demographic to create a standardized size and/or fit for the "athletes" demographic. In this example, cognitive bespoke program 200 accounts for "athletic fit" when creating a standardized chart and, therefore, provides these apparel recommendations for a user in the "athlete" demographic.

In step 220, cognitive bespoke program 200 identifies a user selection of a product. In an embodiment, cognitive bespoke program 200 determines that an online user, while shopping, has selected a product, the product involving an associated product name and description. Cognitive bespoke program 200, using product analyzer 175, begins to process the product for further analysis without an explicit size and/or fit preference given by the user. In an example, cognitive bespoke program 200 identifies that a user has visited a website devoted to carrying multiple brands at a discount and selected a product. In this example, the website provides no sizing information apart from the size indicated on the garment (e.g., small, medium, large, etc.). In this example, cognitive bespoke program 200 consults aggregated database 170 for information and data related to the product.

In step 230, cognitive bespoke program 200 determines the fit-based category of the product. In an embodiment, cognitive bespoke program 200, consulting aggregated database 170, initiates a personalized fit-based categorization of the user-selected apparel product that cognitive bespoke program 200 identified in step 220. In an example, cognitive bespoke program 200 consults aggregated database 170 and determines the brand, "X", of the apparel category "denim jeans." Cognitive bespoke program 200 combines other factors, such as material of the "denim jeans" as containing elastic material for stretch, gender "male", fit nomenclature as "athletic fit", and the corresponding body measurements of the brand, including "inseam length" and "waist." Cognitive bespoke program 200 categorizes the product based on the aforementioned factors. In this example, cognitive bespoke program 200 categorizes the product to aid in the determination of the fit of the product as compared to the standardization across one or more brands that cognitive bespoke program 200 created for a user in step 210. Cognitive bespoke program 200 categorizes the "denim jeans" product as an "athletic fit" fit-based category based upon the description of the product from brand "X". Additionally, cognitive bespoke program 200 retrieves information from aggregated database 170 that the "athletic fit," "denim jeans," are advertised on sporting goods websites, which may also contribute to identifying the product as an "athletic fit".

In step 240, cognitive bespoke program 200 determines preferences for fit of selected product on the user. In an embodiment, cognitive bespoke program 200 performs an estimate of the user preferred size and/or fit of the selected product based upon historical data and information from storage 160. In an example, cognitive bespoke program 200 uses feedback from data on past "returned" product and purchases from products of that category. In this example, cognitive bespoke program 200 analyzes information from aggregated database 170 related to the history of a user's past purchases and/or returns of products from the category (determined in step 220) to estimate current user size and/or fit preferences.

In another embodiment, cognitive bespoke program 200 uses information and data from aggregated database 170 related to the current wardrobe of a user in the collection of the determined category. In this embodiment, cognitive bespoke program 200 also combines data and information from social networks on the fitting of the apparel for the user in the determined category. In this example, a user has entered a plurality of data on a digital wardrobe application or website. Cognitive bespoke program 200, using aggregator 195, combines the data from the digital wardrobe with commentary data from the user on brand websites to estimate the size and/or fit of the selected product on the user using a historical estimate of the size and/or fit of the determined product. In this example, cognitive bespoke program 200 determines that the product is a pair of denim jeans from brand "z." Based upon a historical analysis, and the standardized fit chart (from step 210), cognitive bespoke program 200 generates an estimate of the size and/or fit of a pair of denim jeans for brand "z." Cognitive bespoke program 200 determines that the historical data of the user indicates that the user prefers "athletic fit" clothes. Cognitive bespoke program 200 determines that brand "z" does not make an "athletic fit" jean in a size and/or fit that corresponds to the preferred size and/or fit of the user. Accordingly, cognitive bespoke program 200 estimates the corresponding size for brand "z" despite brand "z" not making an "athletic fit" denim jean.

In step 250, cognitive bespoke program 200 determines an estimated current size and/or fit preference corresponding to the user. In an embodiment, cognitive bespoke program 200 combines the data derived in step 240 to determine an estimated current size and/or fit preference corresponding to the user based on inputs from data related to the current fitness of a user. In an example, cognitive bespoke program 200 further clarifies the measurements corresponding to the user for the user selected, as determined in step 240, product using input from one or more health tracker applications or lifestyle tracker applications. Cognitive bespoke program 200 retrieves data from lifestyle program 140, on computing device 110, to incorporate a plurality of data related to the current health of a user into the size and/or fit preference estimation corresponding to the user. In this example, cognitive bespoke program 200 updates the user profile, and in effect refines the estimate for the preferred size and/or fit corresponding to the user, based upon an analysis of the combined data stream of the fitness-related application on computing device 110. A monthly analysis shows that the user has effectively burned on average 3,500 calories a week for the month. Cognitive bespoke program 200 can also incorporate data related to the daily calorie consumption of the user and the daily heart rate of a user. Cognitive bespoke program 200 estimates that the body of the user has changed based on the data and, that as a result, the user size and/or fit preference may change depending on the particular brand sizing corresponding to the user as determined for a user in step 210. Cognitive bespoke program 200 updates the historical estimates based on data from the fitness-related applications to predict the most appropriate size and/or fit for the user.

In another embodiment, cognitive bespoke program 200 does not change the size and/or fit preference estimate corresponding to a user based upon the data of the lifestyle applications. In an example, cognitive bespoke program 200 analyzes a plurality of data from the lifestyle program 140 and determines that the estimate for the size and/or fit preference corresponding to the user does not change. Cognitive bespoke program 200 analyzes the data from lifestyle program 140 and determines that the user has maintained their current daily, weekly, and monthly caloric input and output. Cognitive bespoke program 200 detects that the data are constant and as a result the estimated size and/or fit corresponding to the user will not change.

In step 260, cognitive bespoke program 200 determines a recommended apparel product for the user-selected apparel product. In an embodiment, a user, based upon input from step 240, cognitive bespoke program 200 combines information retrieved from storage 160 and aggregated database 170 to determine recommended apparel for the user-selected apparel product, for example, based upon size and/or fit information. In an example, cognitive bespoke program 200 retrieves a user's current profile information from storage 160 and information from an online wardrobe application that contains specifications of a user's three favorite pairs of pants in the last three years. Based upon this information, and information analyzed from one or more social networks of the user that provide feedback on pant products purchased by the user, cognitive bespoke program 200 determines that the user prefers "athletic-fit pants." Cognitive bespoke program 200 retrieves information from retailer websites that sell "athletic-fit pants" from aggregated database 170, and the specifications of the "athletic-fit pants" on the websites. Cognitive bespoke program 200 combines (i) the pants specification information and the website addresses of the online retailers with (ii) the user's profile and historical information related to the favorite pants of a user, and then recommends a specific apparel product for a user-selected apparel product on four different retail websites. Cognitive bespoke program 200 applies the learned standardization model of size and fit, as determined in step 210, across multiple brands to determine a recommended garment to the user in the product selected by the user, based upon the information in storage 160 and aggregated database 170. In this example, cognitive bespoke program 200 determines a recommended size and/or fit for the user-selected apparel product.

In step 270, cognitive bespoke program 200 recommends a particular apparel product to a user, for example, a particular size, fit, and/or style. In an embodiment, cognitive bespoke program 200 applies the standardization model across brands to recommend a piece of apparel in one or more brands to a user. In an example, the user's detailed measurements are available to cognitive bespoke program 200. In this example, cognitive bespoke program 200 combines the user's measurements with the profile of the user based on input from fitness applications and applies the standardization model to one or more products from one or more brands. Cognitive bespoke program 200 uses the measurements to map the appropriate user information, as determined in step 250, to the different available sizes in the different brands.

In an example, cognitive bespoke program 200 recommends a particular size in brand A. In another example, cognitive bespoke program 200 recommends and presents additional brands and the corresponding sizes in one or more brands to the user. Cognitive bespoke program 200 presents and recommends that a user, based upon the information in storage 160 and aggregated database 170, may like a different size in brand B, and still another size in brand C.

In another embodiment, cognitive bespoke program 200 determines that no data related to the user's measurements are present. In this example, cognitive bespoke program 200 uses the standardized size chart, in combination with the fitness data, to map the user-preferred size and/or fit to the different available sizes in the different brands.

Figure 3:
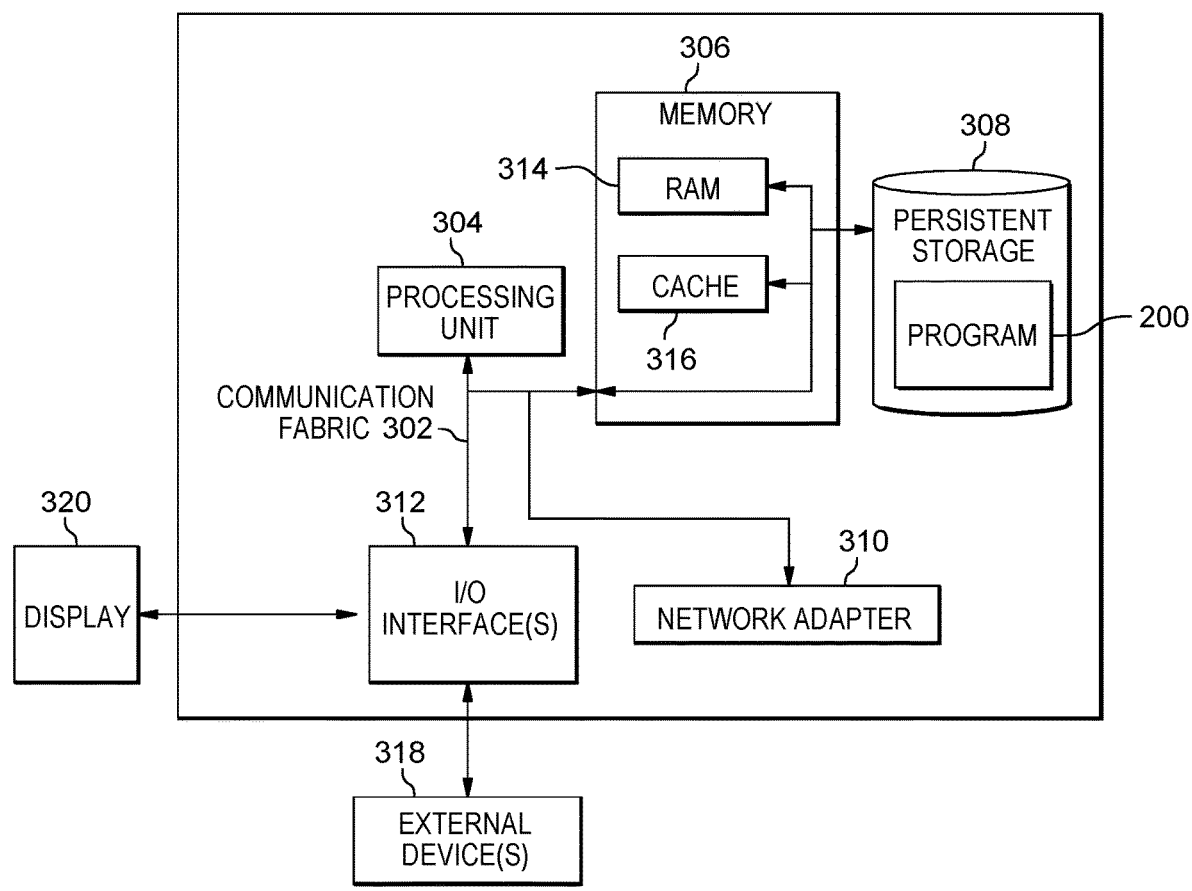
FIG. 3 is a block diagram of components of a computer system, such as the server computer of FIG. 1, in accordance with an embodiment of the present invention.

FIG. 3 depicts a block diagram of components of server 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 120 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 408 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Cognitive bespoke program 200 may be stored in persistent storage 308 and in memory 306 for execution by one or more of the respective computer processors 304 via cache 306. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. cognitive bespoke program 200 may be downloaded to persistent storage 308 through communications unit 310.

I/O interface(s) 312 allows for input and output of data with other devices that may be connected to server 120. For example, I/O interface 312 may provide a connection to external devices 318, such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., cognitive bespoke program 200, can be stored on such portable computer readable storage media and can be loaded onto persistent storage 308 via I/O interface(s) 312. I/O interface(s) 312 also connect to a display 320. Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for recommending an apparel product, the method comprising:
   identifying, by one or processors of a computing device, a selection by a user of an apparel product, wherein the selection further comprises information associated with at least one retail website;
   categorizing, by one or more processors, the apparel product into one or more groupings based upon user preferences, wherein the grouping is based on available versions of the apparel product;
   determining, by one or more processors, current apparel preference information corresponding to the user based on user preferences, fitness application data, health monitoring application data, and user-provided measurements, wherein at least a portion of the health monitoring application data is derived from a lifestyle monitor program of the computing device, wherein the lifestyle monitor program comprises one or more health applications monitoring and tracking, via one or more health or fitness monitoring devices of the user in communication with the lifestyle monitor program, activities effecting a daily caloric intake of the user, wherein the user's daily caloric intake is computed utilizing a cognitive bespoke program of the computing device;
   the lifestyle monitor program utilizing a geographic information system comprising sensors and receivers identifying, based upon the daily caloric intake and utilizing the cognitive bespoke program, a change to apparel preference information of the user over a period of time via receipt and analysis, by the lifestyle monitor program, of information from the one or more health applications;
   determining, by one or more processors, a recommended garment of the identified user-selected apparel product based on mapping the determined current apparel preference information to product specifications of the identified user-selected apparel product, wherein the determining comprises updating apparel preference information contained within a profile of the user based upon the current apparel preference information indicating the change to the apparel preference information; and
   displaying, on a graphical user interface operating on the computing device, the recommended garment.

2. The method of claim 1, wherein determining current apparel preference information comprises:
   incorporating, by one or more processors, historical data from one or more fitness applications into the user-provided measurements, wherein historical data includes changes in a profile of the user; and
   updating, by one or more processors, the user-provided measurements based upon the historical data from one or more fitness applications.

3. The method of claim 1, wherein determining the recommended garment comprises:
   identifying, by one or more processors, data from one or more sources containing the specifications of the user-selected apparel product;
   mapping, by one or more processors, the user-provided measurements to the specifications of the user-selected apparel product; and
   determining, by one or more processors, the recommended garment based on the mapped user-provided measurements to the specifications of the user-selected apparel product.

4. The method of claim 1 wherein determining the recommended garment comprises:
   applying, by one or more processors, a profile corresponding to the user to the user-selected apparel product;
   determining, by one or more processors, a version of the user-selected apparel product that corresponds to the profile; and
   presenting, by one or more processors, the determined version of the user-selected apparel product to the user.

5. The method of claim 1 comprising providing, by one or more processors, the determined recommended garment to the user.

6. The method of claim 1:
   wherein the one or more groupings for the apparel product correspond to fit categories of the apparel product; and
   wherein the fitness application data corresponds to data from one or more data sources selected from the group consisting of: workout apps, personal trainer apps, logbook apps, and gaming exercise apps.

7. The method of claim 1 wherein determining a recommended garment comprises:
   identifying, by one or more processors, a plurality of brands that offer the user-selected apparel product;
   applying, by one or more processors, the current apparel preference information to product information associated with the identified plurality of brands that offer the user-selected apparel product; and
   generating, by one or more processors, a plurality of product recommendations based on the current apparel preference information to product information associated with the identified plurality of brands, wherein the product recommendations include an indication of a brand that offers the user-selected apparel product.

8. A computer program product for recommending an apparel product, the computer program product comprising:
one or more computer readable tangible storage media and program instructions stored on at least one of the one or more computer readable storage media, the program instructions readable/executable by one or more computer processors and comprising:
program instructions to identify, using a computing device, a selection by a user of an apparel product, wherein the selection further comprises information associated with at least one retail website;
program instructions to categorize the apparel product into one or more groupings based upon user preferences, wherein the grouping is based on available versions of the apparel product;
program instructions to determine current apparel preference information corresponding to the user based on user preferences, fitness application data, health monitoring application data, and user-provided measurements, wherein at least a portion of the health monitoring application data is derived from a lifestyle monitor program of the computing device, wherein the lifestyle monitor program comprises one or more health applications monitoring and tracking, via one or more health or fitness monitoring devices of the user in communication with the lifestyle monitor program, activities effecting a daily caloric intake of the user, wherein the user's daily caloric intake is computed utilizing a cognitive bespoke program of the computing device;
the lifestyle monitor program utilizing a geographic information system comprising sensors and receivers identifying, based upon the daily caloric intake and utilizing the cognitive bespoke program, a change to apparel preference information of the user over a period of time via receipt and analysis, by the lifestyle monitor program, of information from the one or more health applications;
program instructions to determine a recommended garment of the identified user-selected apparel product based on mapping the determined current apparel preference information to product specifications of the identified user-selected apparel product, wherein the determining comprises updating apparel preference information contained within a profile of the user based upon the current apparel preference information indicating the change to the apparel preference information; and
program instructions to display, on a graphical user interface operating on the computing device, the recommended garment.

9. The computer program of claim 8, wherein determining current apparel preference information comprises program instructions, stored on the one or more computer readable storage media, which when executed by a processor, cause the processor to:
historical data from one or more fitness applications into the user-provided measurements, wherein historical data includes changes in a profile of the user; and
update the user-provided measurements based upon the historical data from one or more fitness applications.

10. The computer program of claim 8, wherein determining the recommended garment comprises program instructions, stored on the one or more computer readable storage media, which when executed by a processor, cause the processor to:
identify data from one or more sources containing the specifications of the user-selected apparel product;
map the user-provided measurements to the specifications of the user-selected apparel product; and
determine the recommended garment based on the mapped user-provided measurements to the specifications of the user-selected apparel product.

11. The computer program of claim 8, wherein determining the recommended garment comprises program instructions, stored on the one or more computer readable storage media, which when executed by a processor, cause the processor to:
apply a profile corresponding to the user to the user-selected apparel product;
determine a version of the user-selected apparel product that corresponds to the profile; and
present the determined version of the user-selected apparel product to the user.

12. The computer program of claim 8, wherein the program instructions, stored on the one or more computer readable storage media, which when executed by a processor, cause the processor to provide the determined recommended garment to the user.

13. The computer program of claim 8:
wherein the one or more groupings for the apparel product correspond to fit categories of the apparel product; and
wherein the fitness application data corresponds to data from one or more data sources selected from the group consisting of: workout apps, personal trainer apps, logbook apps, and gaming exercise apps.

14. The computer program of claim 8 wherein determining a recommended size of the identified user-selected apparel product further comprises program instructions, stored on the one or more computer readable storage media, which when executed by a processor, cause the processor to:
identify a plurality of brands that offer the user-selected apparel product;
apply the current apparel preference information to product information associated with the identified plurality of brands that offer the user-selected apparel product; and
generate a plurality of product recommendations based on the current apparel preference information to product information associated with the identified plurality of brands, wherein the product recommendations include an indication of a brand that offers the user-selected apparel product.

15. A computer system for recommending a size, the computer system comprising:
one or more computer processors;
one or more computer readable storage media; and
program instructions stored on the one or more computer readable storage media for execution by at least one of the one or more computer processors, the program instructions comprising:
program instructions to program instructions to identify, using a computing device, a selection by a user of an apparel product, wherein the selection further comprises information associated with at least one retail website;
program instructions to categorize the apparel product into one or more groupings based upon user preferences, wherein the grouping is based on available versions of the apparel product;

program instructions to determine current apparel preference information corresponding to the user based on user preferences, fitness application data, health monitoring application data, and user-provided measurements, wherein at least a portion of the health monitoring application data is derived from a lifestyle monitor program of the computing device, wherein the lifestyle monitor program comprises one or more health applications monitoring and tracking, via one or more health or fitness monitoring devices of the user in communication with the lifestyle monitor program, activities effecting a daily caloric intake of the user, wherein the user's daily caloric intake is computed utilizing a cognitive bespoke program of the computing device;

the lifestyle monitor program utilizing a geographic information system comprising sensors and receivers identifying, based upon the daily caloric intake and utilizing the cognitive bespoke program, a change to apparel preference information of the user over a period of time via receipt and analysis, by the lifestyle monitor program, of information from the one or more health applications;

program instructions to determine a recommended garment of the identified user-selected apparel product based on mapping the determined current apparel preference information to product specifications of the identified user-selected apparel product, wherein the determining comprises updating apparel preference information contained within a profile of the user based upon the current apparel preference information indicating the change to the apparel preference information; and program instructions to display, on a graphical user interface operating on the computing device, the recommended garment.

16. The computer system of claim 15 wherein determining current apparel preference information comprises program instructions, stored on the one or more computer readable storage media, which when executed by a processor, cause the processor to:

incorporate historical data from one or more fitness applications into the user-provided measurements, wherein historical data includes changes in a profile of the user; and update the user-provided measurements based upon the historical data from one or more fitness applications.

17. The computer system of claim 15 wherein determining the recommended garment comprises program instructions, stored on the one or more computer readable storage media, which when executed by a processor, cause the processor to:

identify data from one or more sources containing the specifications of the user-selected apparel product;

map the user-provided measurements to the specifications of the user-selected apparel product; and determine the recommended garment based on the mapped user-provided measurements to the specifications of the user-selected apparel product.

18. The computer system of claim 15 wherein determining the recommended garment comprises program instructions, stored on the one or more computer readable storage media, which when executed by a processor, cause the processor to:

apply a profile corresponding to the user to the user-selected apparel product;

determine a version of the user-selected apparel product that corresponds to the profile; and present the determined version of the user-selected apparel product to the user.

19. The computer system of claim 15 wherein the program instructions, stored on the one or more computer readable storage media, which when executed by a processor, cause the processor to provide the determined recommended garment the user.

20. The computer system of claim 15:

wherein the one or more groupings for the apparel product correspond to fit categories of the apparel product; and wherein the fitness application data corresponds to data from one or more data sources selected from the group consisting of: workout apps, personal trainer apps, logbook apps, and gaming exercise apps.

* * * * *